US012662078B2

(12) United States Patent
Jang

(10) Patent No.: US 12,662,078 B2
(45) Date of Patent: Jun. 23, 2026

(54) PASSENGER AIRBAG INCLUDING A PARTITION WALL

(71) Applicant: HYUNDAI MOBIS CO., LTD., Seoul (KR)

(72) Inventor: Rae Ick Jang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/234,948

(22) Filed: Jun. 11, 2025

(65) Prior Publication Data

US 2026/0091755 A1 Apr. 2, 2026

(30) Foreign Application Priority Data

Sep. 30, 2024 (KR) ........................ 10-2024-0132513
Sep. 30, 2024 (KR) ........................ 10-2024-0132514
Sep. 30, 2024 (KR) ........................ 10-2024-0132515

(51) Int. Cl.
*B60R 21/233* (2006.01)

(52) U.S. Cl.
CPC .. *B60R 21/233* (2013.01); *B60R 2021/23324* (2013.01)

(58) Field of Classification Search
CPC .... B60R 2021/0009; B60R 2021/0023; B60R 2021/0048; B60R 2021/23308; B60R 2021/23324; B60R 2021/23382; B60R 21/205; B60R 21/233; B60R 21/2346
See application file for complete search history.

(56) References Cited

U.S. PATENT DOCUMENTS

| | | | | |
|---|---|---|---|---|
| 8,376,396 B2 * | 2/2013 | Miller | .................. | B60R 21/206 |
| | | | | 280/736 |
| 9,272,684 B1 * | 3/2016 | Keyser | .................. | B60R 21/239 |
| 9,428,139 B2 * | 8/2016 | Yamada | ............... | B60R 21/268 |
| 9,505,372 B2 * | 11/2016 | Yamada | ............... | B60R 21/205 |
| 9,533,652 B1 * | 1/2017 | Paxton | .................. | B60R 21/239 |
| 9,550,465 B1 * | 1/2017 | El-Jawahri | ......... | B60R 21/0134 |
| 9,650,011 B1 * | 5/2017 | Belwafa | ............... | B60R 21/233 |
| 9,845,067 B2 * | 12/2017 | Morris | .................. | B60R 21/233 |

(Continued)

FOREIGN PATENT DOCUMENTS

| | | |
|---|---|---|
| CN | 118182379 A | 6/2024 |
| DE | 10 2017 109 359 A1 | 11/2017 |

(Continued)

OTHER PUBLICATIONS

Extended European Search Report Issued on Jan. 5, 2026, in Counterpart European Patent Application No. 25187056.4 (9 Pages in English).

*Primary Examiner* — Laura Freedman
(74) *Attorney, Agent, or Firm* — NSIP Law

(57) ABSTRACT

An airbag including a first protruding panel configured to protrude toward a passenger seat provided in a vehicle, a second protruding panel disposed on one or more of both side portions of the first protruding panel, and a partition wall disposed in the first protruding panel and the second protruding panel and configured to cover an entrance part of the second protruding panel, the partition wall including an inlet hole defined therein, the inlet hole configured to communicate with the entrance part of the second protruding panel in a state in which the partition wall covers the entrance part of the second protruding panel.

19 Claims, 15 Drawing Sheets

(56)     References Cited

U.S. PATENT DOCUMENTS

| | | | | |
|---|---|---|---|---|
| 10,029,643 | B2 * | 7/2018 | Spahn | B60R 21/239 |
| 10,059,299 | B2 * | 8/2018 | Yamada | B60R 21/233 |
| 10,099,646 | B2 * | 10/2018 | Jang | B60R 21/239 |
| 10,155,496 | B2 * | 12/2018 | Faruque | B60R 21/233 |
| 10,183,645 | B2 * | 1/2019 | Rose | B60R 21/01552 |
| 10,293,775 | B2 * | 5/2019 | Wang | B60R 21/205 |
| 10,293,777 | B2 * | 5/2019 | Paxton | B60R 21/239 |
| 10,308,207 | B2 * | 6/2019 | Ohno | B60R 21/233 |
| 10,315,610 | B2 * | 6/2019 | Moritani | B60R 21/233 |
| 10,322,693 | B2 * | 6/2019 | Yoo | B60R 21/203 |
| 10,351,090 | B2 * | 7/2019 | Yamada | B60R 21/233 |
| 10,363,895 | B2 * | 7/2019 | Yamada | B60R 21/231 |
| 10,632,959 | B2 * | 4/2020 | Jeong | B60R 21/233 |
| 10,814,822 | B2 * | 10/2020 | Kanegae | B60R 21/233 |
| 10,926,731 | B2 * | 2/2021 | Nakajima | B60R 21/233 |
| 10,926,734 | B2 * | 2/2021 | Yamada | B60R 21/233 |
| 11,192,513 | B2 * | 12/2021 | Takeuchi | B60R 21/205 |
| 11,267,432 | B2 * | 3/2022 | Nakajima | B60R 21/233 |
| 11,325,558 | B2 * | 5/2022 | Jang | B60R 21/262 |
| 11,390,240 | B2 * | 7/2022 | Aranzulla | B60R 21/233 |
| 11,760,302 | B2 * | 9/2023 | Suzuki | B60R 21/2334 |
| | | | | 280/739 |
| 11,820,313 | B2 * | 11/2023 | Yamamoto | B60R 21/207 |
| 11,858,446 | B2 * | 1/2024 | Shen | B60R 21/231 |
| 11,858,452 | B2 * | 1/2024 | Koh | B60R 21/2338 |
| 11,945,395 | B1 * | 4/2024 | Farooq | B60R 21/233 |
| 12,269,414 | B2 * | 4/2025 | Tanaka | B60R 21/205 |
| 2007/0052222 | A1 | 3/2007 | Higuchi et al. | |
| 2018/0361978 | A1 * | 12/2018 | Belwafa | B60R 21/233 |
| 2019/0009745 | A1 * | 1/2019 | Hikida | B60R 21/2346 |
| 2019/0241147 | A1 | 8/2019 | Kanegae et al. | |
| 2024/0190378 | A1 * | 6/2024 | Mashiko | B60R 21/233 |

FOREIGN PATENT DOCUMENTS

| | | |
|---|---|---|
| JP | 2016-40155 A | 3/2016 |
| JP | 2016-40160 A | 3/2016 |
| JP | 2022-87592 A | 6/2022 |

* cited by examiner

500

PASSENGER AIRBAG INCLUDING A PARTITION WALL

CROSS-REFERENCE TO RELATED APPLICATION

This application claims priority to and the benefit of Korean Patent Application No. 10-2024-0132513, filed on Sep. 30, 2024, Korean Patent Application No. 10-2024-0132514, filed on Sep. 30, 2024, and Korean Patent Application No. 10-2024-0132515, filed on Sep. 30, 2024, the entire disclosures of which are incorporated herein by reference in their entirety.

BACKGROUND

1. Field of the Invention

The present invention relates to a passenger airbag installed in a cockpit module to be deployed toward a passenger sitting in a passenger seat.

2. Discussion of Related Art

Generally, a passenger airbag is installed in the cockpit module to protect a passenger sitting in a passenger seat in the event of a vehicle collision. The passenger airbag deploys from the cockpit module to the passenger sitting in a passenger seat in the event of the vehicle collision.

Recently, regulations on oblique collisions other than a head-on collision in the event of a collision with a vehicle, an obstacle or a person are being tightened. Accordingly, a recent passenger airbag includes not only a main panel which protrudes from a cockpit module and is deployed toward a passenger but also a protruding panel which has a shape protruding from the main panel and comes into contact with a side portion of a passenger's head when the passenger airbag is deployed. Accordingly, in the event of the oblique collision, the protruding panel can prevent head injuries to the passenger even when the passenger's head is rotated.

In this case, the protruding panel may have a shape connected to at least one of both side portions of the main panel. Accordingly, when gas is generated from an inflator connected to the main panel, the gas flows from the main panel toward the protruding panel to inflate the protruding panel.

However, there may be a problem in that the gas accommodated in the protruding panel flows from the protruding panel toward the main panel when the collision accident occurs and the passenger's head comes into contact with the protruding panel. Then, when the passenger's head comes into contact with the protruding panel, an inflation amount of the protruding panel is rapidly reduced, which may reduce a support force of the protruding panel which should support the passenger's head.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided an airbag including a first protruding panel configured to protrude toward a passenger seat provided in a vehicle, a second protruding panel disposed on one or more of both side portions of the first protruding panel, and a partition wall disposed in the first protruding panel and the second protruding panel and configured to cover an entrance part of the second protruding panel, the partition wall including an inlet hole defined therein, the inlet hole configured to communicate with the entrance part of the second protruding panel in a state in which the partition wall covers the entrance part of the second protruding panel.

The partition wall may include a main body portion configured to form an exterior and the inlet hole of the partition wall may be defined within the main body portion.

In the state in which the partition wall covers the entrance part of the second protruding panel, both side end portions of the main body portion may be coupled to a boundary, the boundary being defined between the first protruding panel and the second protruding panel.

A first width of the main body portion of the partition wall may be greater than a second width of the entrance part of the second protruding panel.

The partition wall may be configured to curve toward the first protruding panel in the state in which the partition wall covers the entrance part of the second protruding panel.

The partition wall may be configured to reduce an area of the entrance part of the second protruding panel.

In a general aspect, here is provided an airbag including a first protruding panel configured to protrude toward a passenger seat provided in a vehicle, a second protruding panel disposed on one or more of both side portions of the first protruding panel, and a partition wall configured to adjust an inflow amount of gas flowing from the first protruding panel toward the second protruding panel, the second protruding panel being configured to be deployed after the first protruding panel is deployed, the partition wall including an inlet hole defined therein, the inlet hole configured to pass through a portion of the partition wall to connect an inner space of the first protruding panel to an inner space of the second protruding panel.

The partition wall may include a main body portion configured to form an exterior and the inlet hole of the partition wall may be defined within the main body portion.

first width of the main body portion of the partition wall may be greater than a second width of an entrance part of the second protruding panel.

The partition wall may be configured to curve toward the first protruding panel in a state in which the partition wall covers an entrance part of the second protruding panel.

In a general aspect, here is provided a passenger airbag for a passenger seat in a vehicle including a first protruding panel configured to protrude toward the passenger seat, a second protruding panel disposed on one or more of both side portions of the first protruding panel, a partition wall disposed in the first protruding panel and the second protruding panel and configured to cover an entrance part of the second protruding panel, and a guide panel connected to the partition wall and configured to connect an inner portion of the first protruding panel and an inner portion of the second protruding panel.

The guide panel may be disposed toward the second protruding panel from the first protruding panel in a state in which the guide panel is connected to the partition wall.

The guide panel may include an entrance end portion connected to the inner portion of the first protruding panel, the entrance end portion being connected to the partition wall and an exit end portion connected to the inner portion of the second protruding panel.

The partition wall may include a main body portion forming an exterior of the partition wall and an inlet hole defined within the main body portion and configured to connect the inner portion of the first protruding panel and the inner portion of the second protruding panel.

The entrance end portion of the guide panel may be configured to communicate with the inlet hole of the partition wall.

The inner portion of the first protruding panel, the inlet hole of the partition wall, and the guide panel may define a path through which gas flows to the inner portion of the second protruding panel.

Both side end portions of the main body portion of the partition wall may be coupled to a boundary between the first protruding panel and the second protruding panel in a state in which the partition wall covers the entrance part of the second protruding panel.

A first width of the main body portion of the partition wall may be greater than a second width of the entrance part of the second protruding panel.

The partition wall may be configured to curve toward the first protruding panel in a state in which the partition wall covers the entrance part of the second protruding panel.

In a general aspect, here is provided a passenger airbag for a passenger seat in a vehicle including a first protruding panel configured to protrude toward the passenger seat, a second protruding panel disposed on one or more of both side portions of the first protruding panel, a partition wall provided in the first protruding panel and the second protruding panel and configured to cover an entrance part of the second protruding panel, and a guide panel configured to protrude from the partition wall and to guide gas flowing in an inner portion of the first protruding panel to an inner portion of the second protruding panel.

In a general aspect, here is provided a passenger airbag for a passenger seat in a vehicle including a first protruding panel configured to protrude toward the passenger seat, a second protruding panel disposed on one or more of both side portions of the first protruding panel, and a partition wall configured to cover an entrance part of the second protruding panel, the partition wall and an inner surface of the second protruding panel forming two or more inlets in a state in which the partition wall covers the entrance part of the second protruding panel.

The partition wall may include a main body portion forming an exterior of the partition wall and concave portions disposed at corners of the main body portion, and the concave portions and the second protruding panel may form the inlets.

The partition wall may include coupling portions disposed between the concave portions, the coupling portions being coupled to a boundary between the first protruding panel and the second protruding panel.

The coupling portions may include a first coupling portion including a 1-1 coupling portion and a 1-2 coupling portion, the 1-1 coupling portion and the 1-2 coupling portion being configured to protrude from both side portions of the main body portion and a second coupling portion including a 2-1 coupling portion and a 2-2 coupling portion, the 2-1 coupling portion and the 2-2 coupling portion being configured to protrude from the main body portion and to be disposed to intersect the first coupling portion.

The concave portions may be disposed between the first coupling portion and the second coupling portion of the coupling portions.

A first distance from an end portion of the 1-1 coupling portion to an end portion of the 1-2 coupling portion of the partition wall may be greater than a first width of the second protruding panel.

A second distance from an end portion of the 2-1 coupling portion to an end portion of the 2-2 coupling portion of the partition wall may be greater than a second width of the entrance part of the second protruding panel.

The partition wall may be configured to curve toward the first protruding panel in a state in which the partition wall covers the entrance part of the second protruding panel.

In a general aspect, here is provided a passenger airbag a passenger seat in a vehicle including a first protruding panel configured to protrude toward the passenger seat, a second protruding panel disposed on one or more of both side portions of the first protruding panel, and a partition wall configured to adjust an inflow amount of gas flowing from the first protruding panel toward the second protruding panel, the second protruding panel being configured to be deployed after the first protruding panel is deployed, the partition wall including a main body portion configured to form an exterior thereof and concave portions disposed at corners of the main body portion, and the concave portions and the second protruding panel forming inlets.

The partition wall may include a coupling portion disposed between the concave portions and coupled to a boundary between the first protruding panel and the second protruding panel.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

Figure 1:
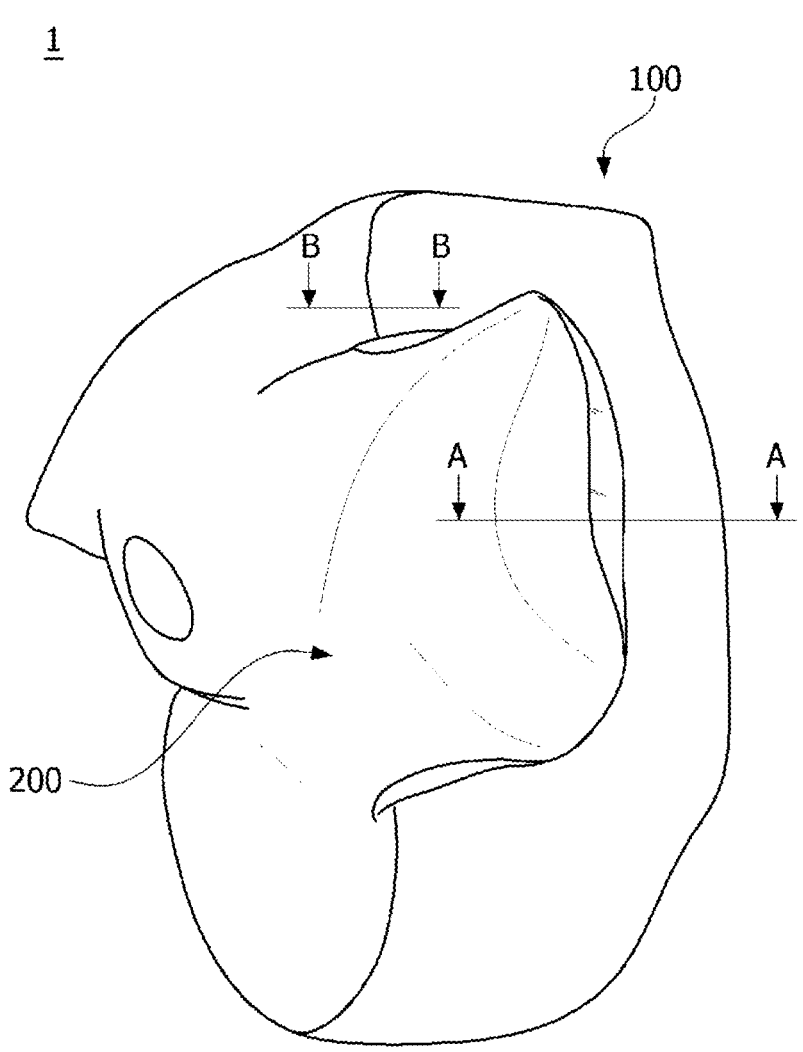
FIG. 1 is a perspective view illustrating a passenger airbag according to one embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, when a passenger airbag is described in detail with reference to the accompanying drawings, components that are the same or correspond to each other will be denoted by the same reference numerals in all drawings, and redundant descriptions will be omitted.

The present invention is directed to providing a passenger airbag improved to prevent a phenomenon in which an inflation amount of a protruding panel is rapidly reduced when a passenger's head comes into contact with the protruding panel.

Figure 2:
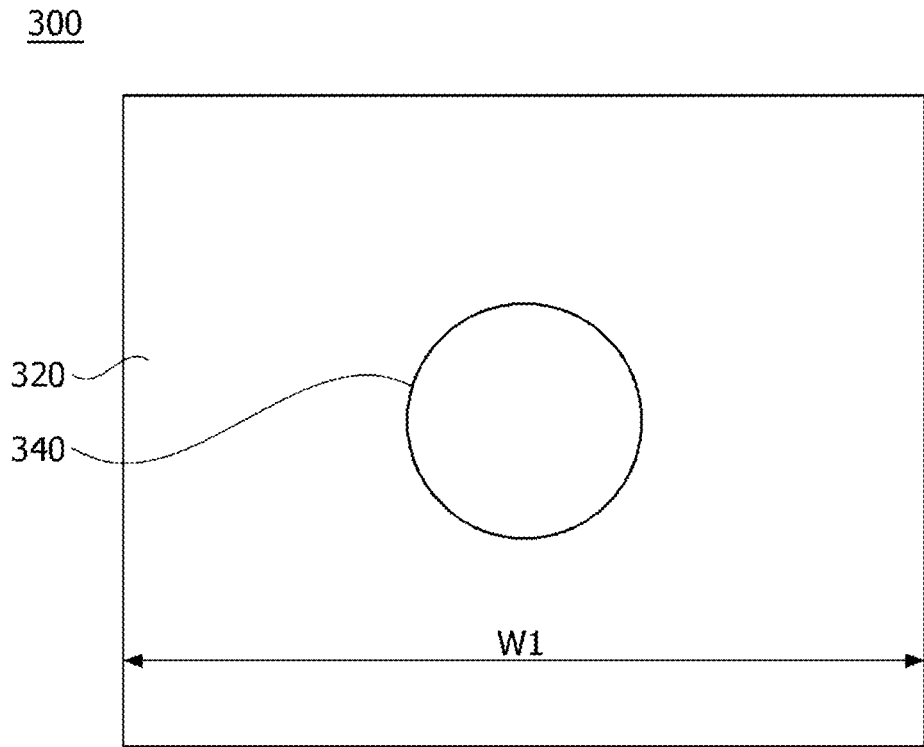
FIG. 2 is a view illustrating a partition wall.
Figure 3:
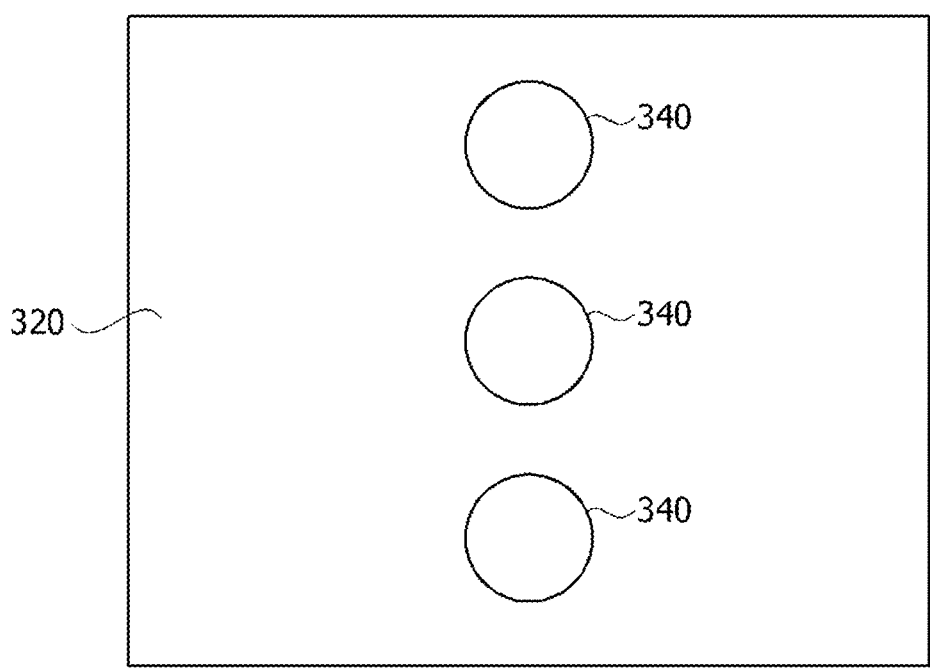
FIG. 3 is a view illustrating another example of an inlet hole of a partition wall.

FIG. 1 is a perspective view illustrating a passenger airbag according to one embodiment of the present invention, and FIG. 2 is a view illustrating a partition wall. FIG. 3 is a view illustrating another example of an inlet hole of the partition wall and FIG. 4 is a schematic side view illustrating an inner portion of the passenger airbag.

Figure 4:
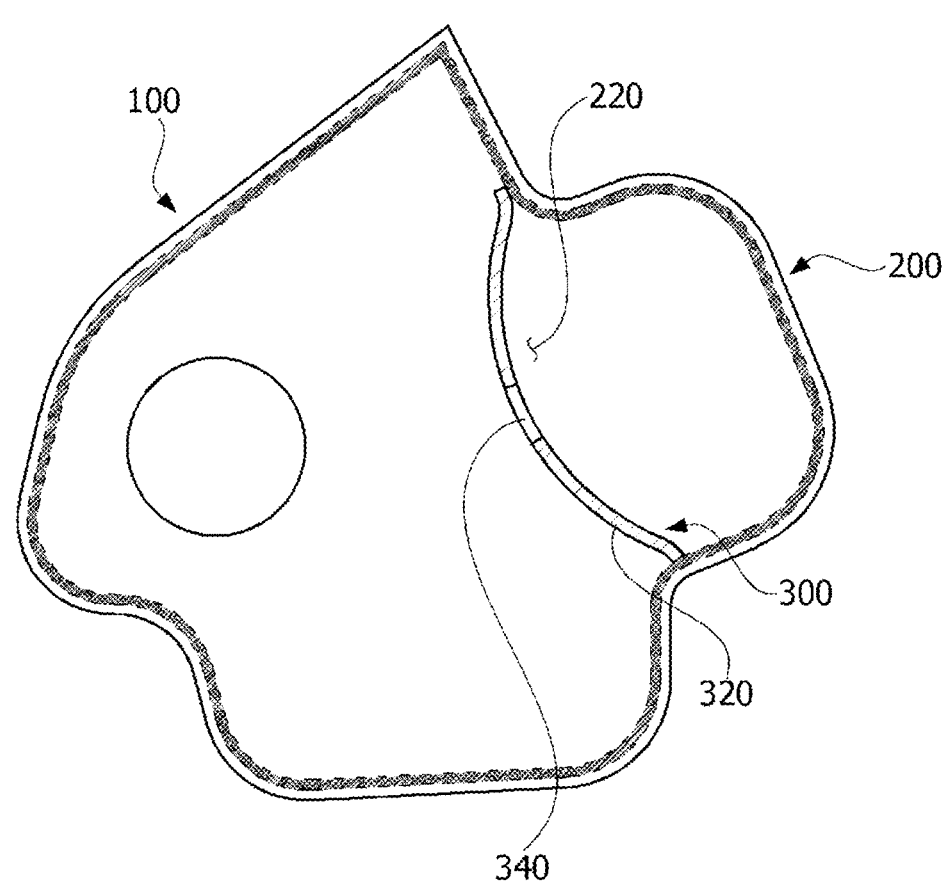
FIG. 4 is a schematic side view illustrating an inner portion of the passenger airbag.

Referring to FIGS. 1 and 4, a passenger airbag 1 according to one embodiment of the present invention may be disposed in a cockpit module (not shown) of a vehicle. More specifically, in a state in which the passenger airbag 1 is disposed in the cockpit module, the passenger airbag 1 may be deployed toward a passenger seat which is a next seat of a driver seat of seats provided in the vehicle. Accordingly, when a collision accident occurs, the passenger airbag 1 may protect a front part of an upper body including a face, shoulders, and a chest of the passenger sitting in the passenger seat. The passenger airbag 1 may include a deployment part, which includes a first protruding panel 100 and a second protruding panel 200, and a partition wall 300.

The deployment part may be accommodated in the cockpit module in a state of being folded. The deployment part may be connected to an inflator. The deployment part may include the first protruding panel 100 and the second protruding panel 200.

The first protruding panel 100 may be connected to the second protruding panel 200 and may support the second protruding panel 200. In addition, the first protruding panel 100 may be coupled to the inflator (not shown) for generating gas and inflated by the gas generated from the inflator. To this end, the first protruding panel 100 may have a hollow shape, and two members such as cloths or the like may be in contact with each other, and then edges of two members may be bonded to form the first protruding panel 100.

The first protruding panel 100 may protrude toward the passenger seat. More specifically, in a state in which the first protruding panel 100 is disposed in the cockpit module, the first protruding panel 100 may protrude to penetrate the cockpit module and be deployed toward the passenger seat. Here, a vent hole may be provided in the first protruding panel 100. The vent hole may be a hole which guides the gas accommodated in the first protruding panel 100 to the outside of the first protruding panel 100 in order to prevent over deployment of the first protruding panel 100.

The second protruding panel 200 may be disposed on at least any one of both side portions of the first protruding panel 100. Like the first protruding panel 100, the second protruding panel 200 may accommodate the gas generated from the inflator. To this end, the second protruding panel

200 may have a hollow shape, two members such as cloths or the like may be in contact with each other, and then edges of two members may be bonded to form the second protruding panel 200. In this case, the second protruding panel 200 may be integrally formed with the first protruding panel 100. That is, the second protruding panel 200 may have a shape protruding from the first protruding panel 100.

The second protruding panel 200 may include an entrance part 220 formed at a boundary which is a portion in contact with the first protruding panel 100. The entrance part 220 may connect the first protruding panel 100 to the second protruding panel 200 and may serve as a passage to guide the gas accommodated in the first protruding panel 100 to the second protruding panel 200.

Figure 5:
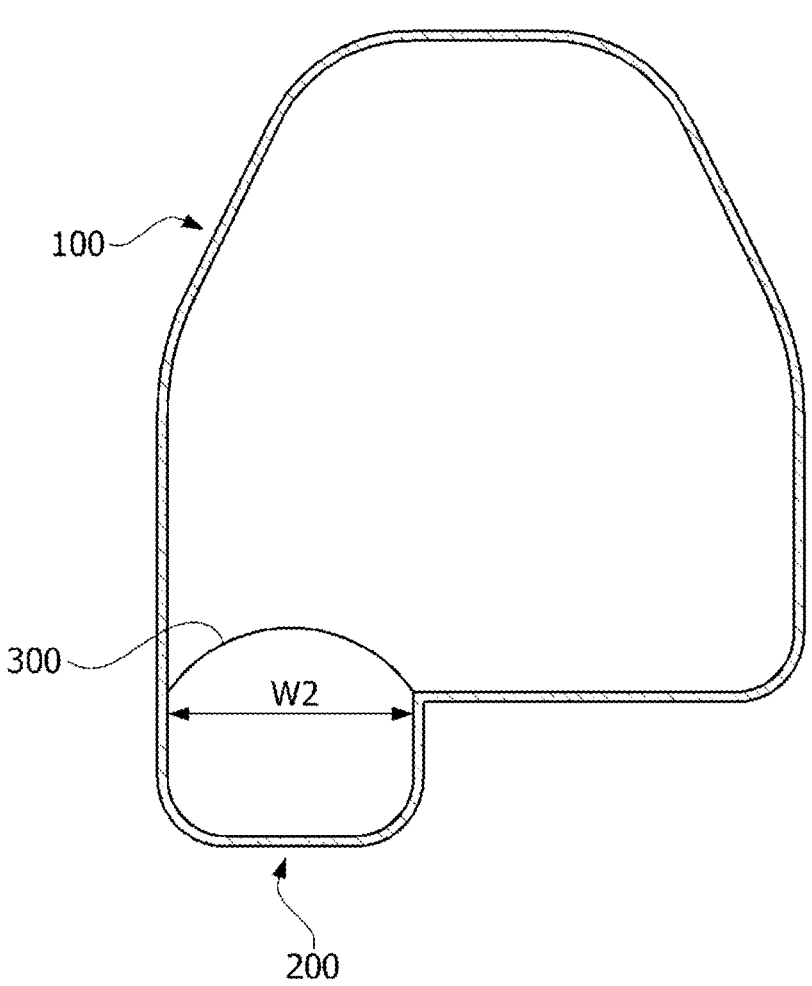
FIG. 5 is a cross-sectional view along line A-A of FIG. 1.
Figure 6:
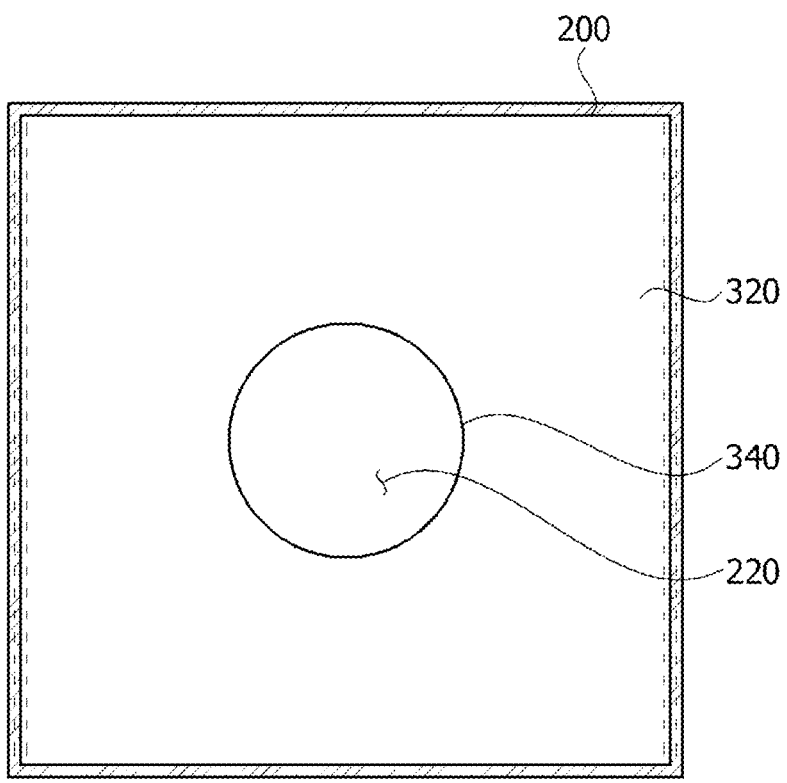
FIG. 6 is a cross-sectional view along line B-B of FIG. 1.

FIG. 5 is a cross-sectional view along line A-A of FIG. 1, and FIG. 6 is a cross-sectional view along line B-B of FIG. 1.

Referring to FIGS. 2, 4, to 6, the partition wall 300 may be disposed in the deployment part. The partition wall 300 may cover the entrance part 220 of the second protruding panel 200. The partition wall 300 may adjust an inflow amount of the gas flowing from the first protruding panel 100 toward the second protruding panel 200 such that the second protruding panel 200 is deployed after the first protruding panel 100 is deployed. The partition wall 300 may include a main body portion 320 and an inlet hole 340.

The main body portion 320 may form an exterior of the partition wall 300. The main body portion 320 may support a coupling part. The main body portion 320 may be disposed at the entrance part 220 formed in the second protruding panel 200. Accordingly, the main body portion 320 may cover a portion of the entrance part 220 of the second protruding panel 200 to block the gas flowing in the first protruding panel 100 from being introduced into the second protruding panel 200.

The inlet hole 340 may be formed in the main body portion 320. More specifically, the inlet hole 340 may be a hole passing through a portion of the main body portion 320 to connect an inner space of the first protruding panel 100 to an inner space of the second protruding panel 200. The inlet hole 340 may be disposed in a central portion of the main body portion 320 but is not limited thereto. The inlet hole 340 may communicate with the entrance part 220 of the second protruding panel 200 in a state in which the entrance part 220 of the second protruding panel 200 is covered. In addition, as illustrated in FIG. 2, the inlet hole 340 may have a circular shape but is not limited thereto.

In addition, referring to FIG. 3, the inlet hole 340 may be formed as a plurality of inlet holes 340 in the main body portion 320. In this case, the inlet holes 340 may be disposed apart from each other in a height direction which is a direction from an upper portion toward a lower portion of the main body portion 320 based on FIG. 3. In addition, although not illustrated in the drawing, the plurality of inlet holes 340 formed in the main body portion 320 may be disposed apart from each other in a width direction which is a direction perpendicularly intersecting the height direction and may be disposed apart from each other in a direction, which is inclined with respect to the height direction or the width direction, between the height direction and the width direction.

Referring to FIG. 6, in a state in which the partition wall 300 covers the entrance part 220 of the second protruding panel 200, both side end portions of the main body portion 320 of the partition wall 300 may be coupled to the boundary between the first protruding panel 100 and the second protruding panel 200. In addition, referring to FIGS. 2, 4, and 5, a first width W1 of the main body portion 320 of the partition wall 300 may be greater than a second width W2 of the entrance part 220 of the second protruding panel 200. As illustrated in FIGS. 4 and 5, due to the features of the partition wall 300, the partition wall 300 disposed in the deployment part may be disposed to be curved toward the first protruding panel 100 in a state in which the partition wall 300 covers the entrance part 220 of the second protruding panel 200. In addition, as illustrated in FIG. 6, when the second protruding panel 200 is viewed from above, the partition wall 300 may cover an entire region of the entrance part 220 of the second protruding panel 200.

This is for the partition wall 300 to reduce an area of the entrance part 220 of the second protruding panel 200 to reduce an amount of gas flowing from the first protruding panel 100 toward the second protruding panel 200 and also to allow gas to flow through a gap between the first protruding panel 100 and the partition wall 300 disposed to be curved toward the first protruding panel 100. Accordingly, a phenomenon in which a time for which gas is introduced into the second protruding panel 200 is delayed may occur compared to in the conventional airbag structure without a partition wall 300. Accordingly, a phenomenon in which the second protruding panel 200 is deployed earlier than the first protruding panel 100 may be prevented.

More specifically, when gas is generated from the inflator, the gas flows from the first protruding panel 100 toward the second protruding panel 200 in a direction in which the gas is supplied. In this case, when a partition wall 300 is not present, a situation in which only a second protruding panel 200 is fully inflated by a flow of gas flowing toward the second protruding panel 200 may occur in a state in which a first protruding panel 100 is not fully inflated.

This may cause a problem that a passenger airbag 1 does not reach a body portion of a passenger when a collision accident occurs. Accordingly, the partition wall 300 may be disposed in the deployment part in order to prevent the problem. That is, since an area of the entrance part 220 of the second protruding panel 200 is reduced due to the partition wall 300, an amount of the gas flowing from the first protruding panel 100 toward the second protruding panel 200 may be smaller than that in a state in which the entrance part 220 of the second protruding panel 200 is completely open. Accordingly, after the first protruding panel 100 is sufficiently deployed, the second protruding panel 200 may be deployed.

As described above, since the passenger airbag 1 according to one embodiment of the present invention has a structure in which the second protruding panel 200 is inflated after the first protruding panel 100 is sufficiently inflated through the partition wall 300, when a collision accident occurs, the deployment part may reach the body portion of the passenger sitting in the passenger seat in a time range calculated in a manufacturing process. Accordingly, when the collision accident occurs, an additional injury due to delayed deployment of the airbag can be prevented.

In addition, according to one embodiment of the present invention, the passenger airbag 1 may have a structure in which the partition wall 300 is disposed in the development part such that gas flows only through the inlet hole 340 of the partition wall 300 and a gap between the first protruding panel 100 and the partition wall 300 disposed to be curved toward the first protruding panel 100.

This means that, in a state in which the gas is introduced into the second protruding panel 200, an amount of the gas flowing from the second protruding panel 200 toward the first protruding panel 100 is smaller than that in a conventional case in which a partition wall 300 is not present. Accordingly, when the passenger airbag 1 is deployed, a tension of the second protruding panel 200 may be maintained. Accordingly, when the second protruding panel 200 comes into contact with the passenger's head, a phenomenon in which the second protruding panel 200 is pushed out by a force of the passenger's head coming into contact with the second protruding panel 200 may be prevented.

Figure 7:
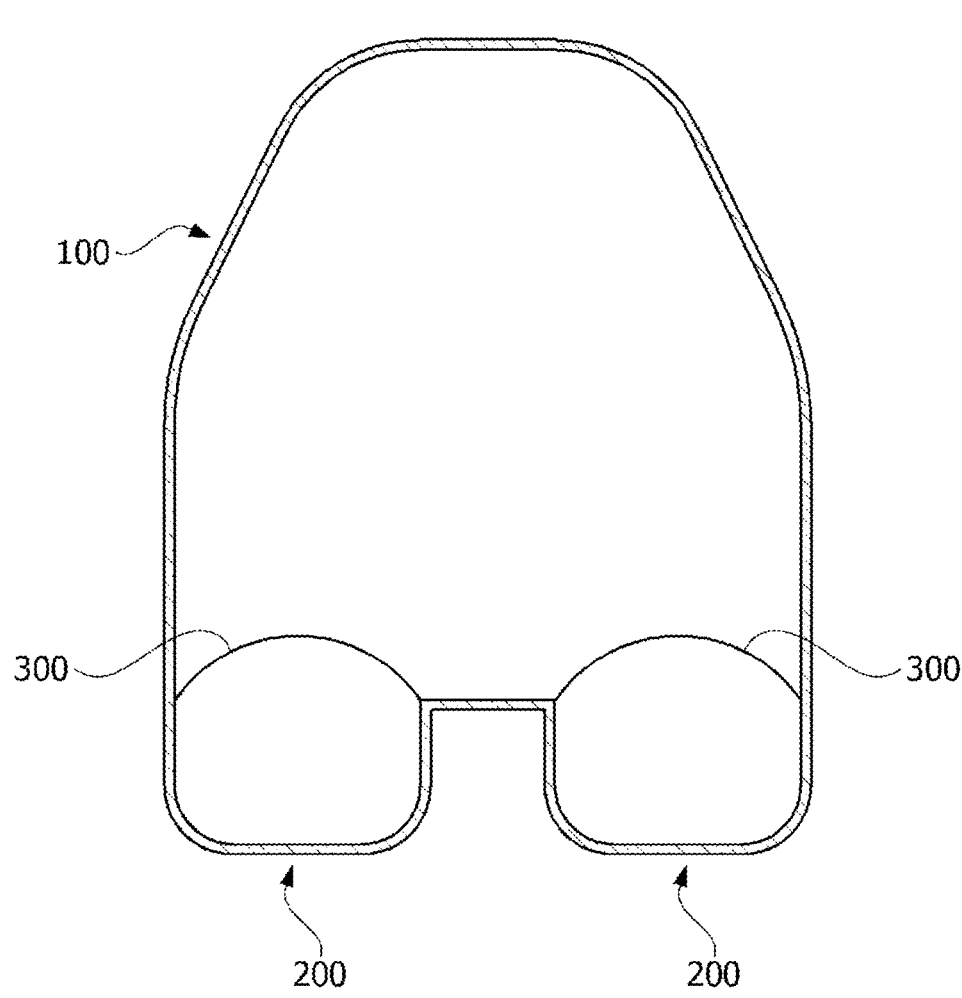
FIG. 7 is a view illustrating a plurality of second protruding panels and a plurality of partition walls.

FIG. 7 is a view illustrating a plurality of second protruding panels and a plurality of partition walls.

Referring to FIG. 7, the second protruding panel 200 may be disposed on each of both side portions of the first protruding panel 100. That is, the second protruding panel 200 may be provided as a plurality of second protruding panels 200. Accordingly, the partition wall 300 may also be provided as a plurality of partition walls 300 to cover the entrance part 220 of each of the second protruding panels 200. As described above, in the passenger airbag 1 of the present invention, the number of the partition walls 300 may be provided to correspond to the number of the second protruding panels 200 protruding from the first protruding panel 100 to maintain an inflation amount of the plurality of second protruding panels 200.

Hereinafter, a guide panel 400 will be described.

Figure 8:
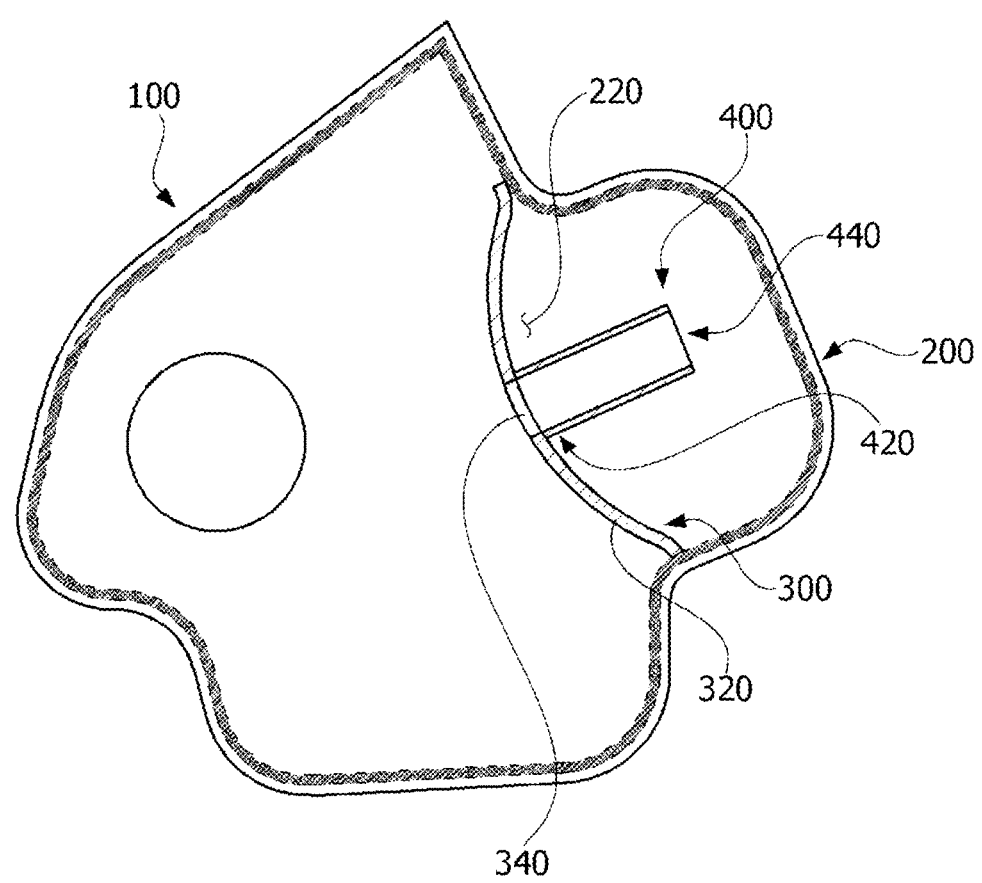
FIG. 8 is a side view illustrating a guide panel which is disposed in a main body portion of the partition wall.
Figure 9:
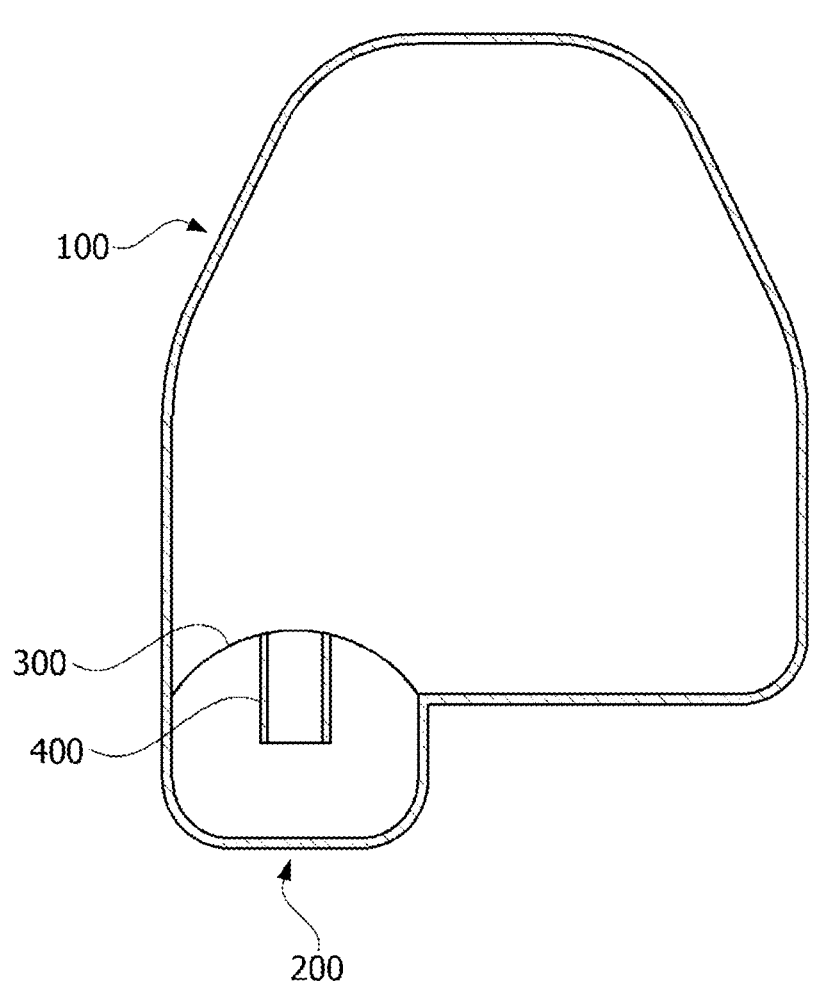
FIG. 9 is a plan view illustrating the guide panel which is disposed in the main body portion of the partition wall.
Figure 10:
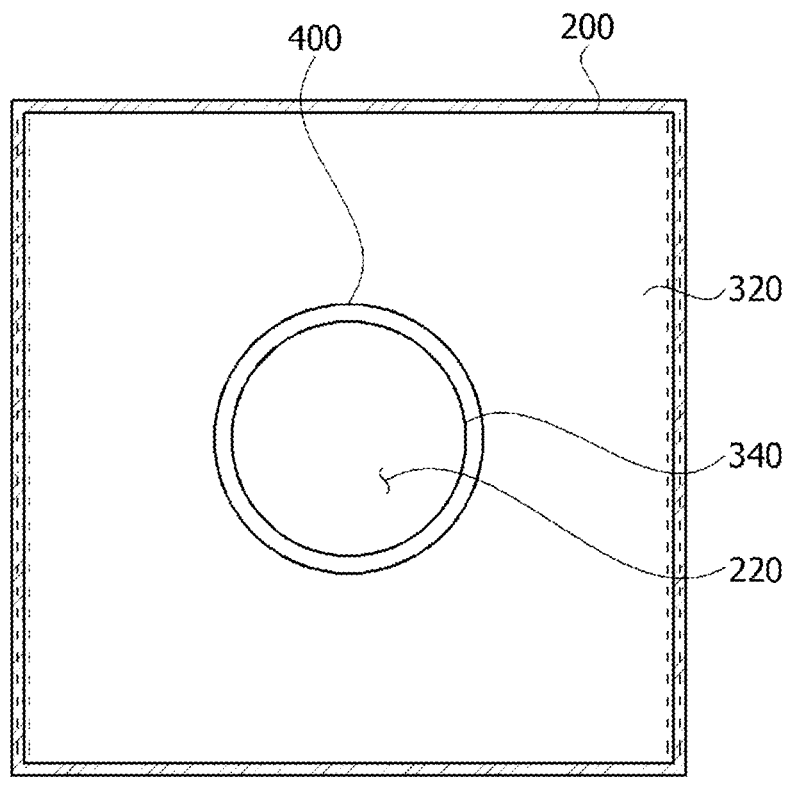
FIG. 10 is a view illustrating a state in which the guide panel is added to the cross-sectional view of FIG. 6.
Figure 11:
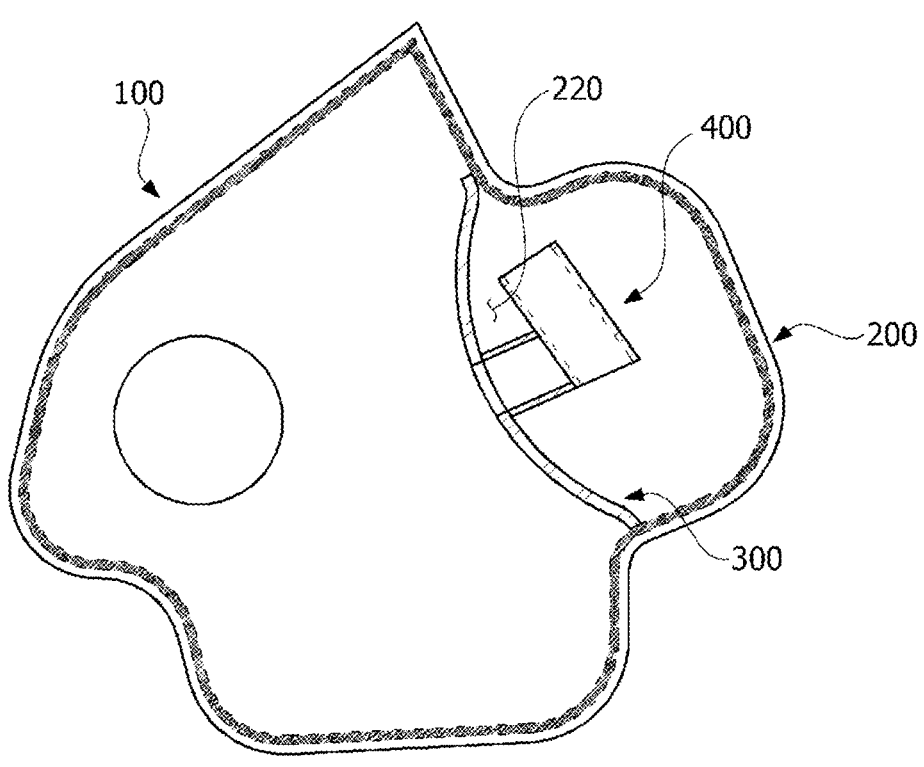
FIG. 11 is a view illustrating the guide panel which is bent.

FIG. 8 is a side view illustrating the guide panel which is disposed in the main body portion of the partition wall, and FIG. 9 is a plan view illustrating the guide panel which is disposed in the main body portion of the partition wall. FIG. 10 is a view illustrating a state in which the guide panel is added to the cross-sectional view of FIG. 6, and FIG. 11 is a view illustrating the guide panel which is bent.

Referring to FIGS. 8 to 10, the passenger airbag 1 according to one embodiment of the present invention may further include the guide panel 400. The guide panel 400 may be connected to the partition wall 300 and may connect an inner portion of the first protruding panel 100 and an inner portion of the second protruding panel 200. The guide panel 400 may have a hollow cylindrical shape.

The guide panel 400 may include an entrance end portion 420 connected to the inner portion of the first protruding panel 100 by being connected to the partition wall 300 and an exit end portion 440 connected to the inner portion of the second protruding panel 200. In this case, the entrance end portion 420 of the guide panel 400 may communicate with the inlet hole 340 of the partition wall 300.

That is, the guide panel 400 may be disposed toward the second protruding panel 200 from the first protruding panel 100 in a state of being connected to the partition wall 300. Accordingly, the guide panel 400 may protrude from the partition wall 300 and guide gas flowing in the first protruding panel 100 into the second protruding panel 200.

The inner portion of the first protruding panel 100, the inlet hole 340 of the partition wall 300, and the guide panel 400 may form a path through which gas flows into the second protruding panel 200. The guide panel 400 may allow the gas, which is introduced into the second protruding panel 200 through the inlet hole 340 of the partition wall 300, to flow finally.

That is, the partition wall 300 and the guide panel 400 may delay that the gas flowing from the first protruding panel 100 toward the second protruding panel 200 passes through the entrance part 220 of the second protruding panel 200 to immediately inflate the second protruding panel 200. Since the partition wall 300 and the guide panel 400 guide the second protruding panel 200 to be deployed later than the first protruding panel 100, a situation in which the second protruding panel 200 is fully inflated first in a state in which the first protruding panel 100 is not fully inflated may be prevented.

That is, in the present invention, since a structure is formed in which the second protruding panel 200 is inflated after the first protruding panel 100 is sufficiently inflated through the partition wall 300 and the guide panel 400, when a collision accident occurs, the first protruding panel 100 and the second protruding panel 200 may reach the body portion of the passenger sitting in the passenger seat in a time range calculated in a manufacturing process. Accordingly, when the collision accident occurs, an additional injury due to delayed deployment of the airbag can be prevented.

Although not illustrated in the drawings, the number of guide panels 400 may be provided to correspond to the number of the inlet holes 340 formed in the main body portion 320 of the partition wall 300. That is, when the plurality of inlet holes 340 are formed in the partition wall 300, a plurality of guide panels 400 may be coupled to the partition wall 300 so that each of the plurality of guide panels 400 is connected to the corresponding one of the inlet holes 340.

Referring to FIG. 11, when an oblique collision accident occurs, and the passenger's head comes into contact with the second protruding panel 200, the guide panel 400 may be bent. Accordingly, a phenomenon in which a large amount of the gas accommodated in the second protruding panel 200 rapidly flows toward the first protruding panel 100 may be prevented. Accordingly, since rapid reduction of an inflation amount of the second protruding panel 200 is prevented, rapid reduction of a support force of the second protruding panel 200 may be prevented. Accordingly, a situation in which the passenger's head is additionally injured due to a state in which the inflation of the second protruding panel 200 is rapidly reduced can be prevented.

According to one embodiment of the present invention, a rapid reduction in an amount of gas flowing from a second protruding panel to a first protruding panel can be prevented by a partition wall disposed in a deployment part. Accordingly, when an oblique collision accident occurs and a passenger's head comes into contact with the second protruding panel, a situation in which an inflation amount of the second protruding panel is rapidly reduced is prevented, thereby preventing rapid reduction of a support force of the second protruding panel.

Hereinafter, another example of the partition wall will be described.

Figure 12:
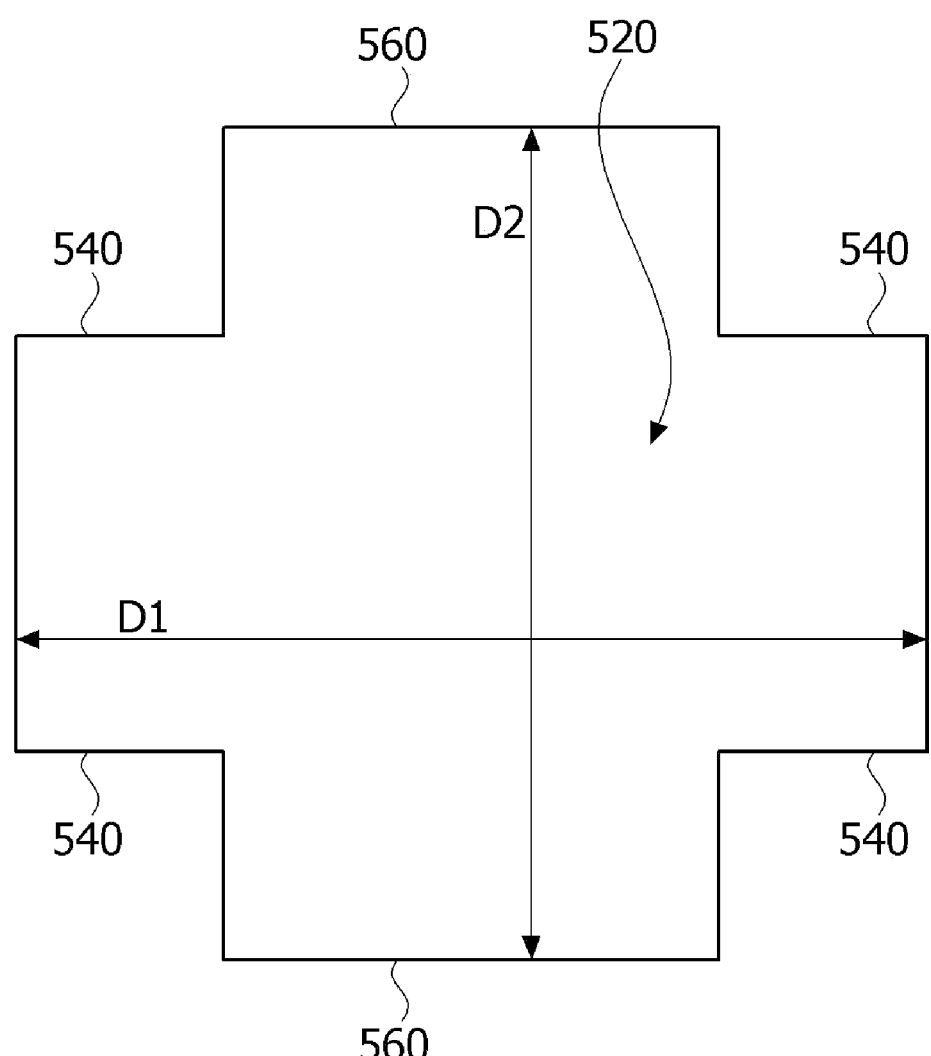
FIG. 12 is a view illustrating another example of a partition wall.
Figure 13:
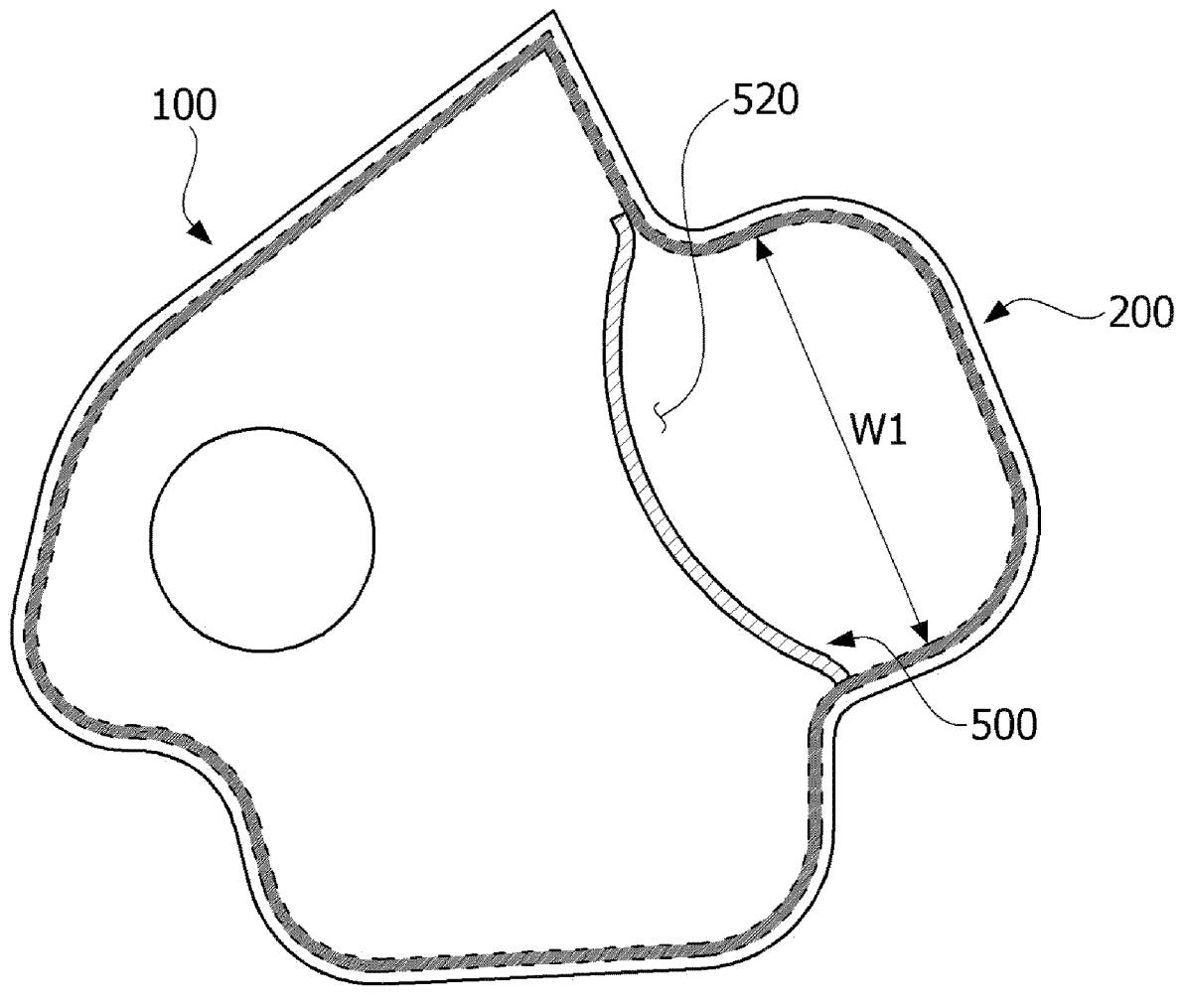
FIG. 13 is a cross-sectional view illustrating the partition wall of FIG. 12 disposed in a first protruding panel.
Figure 14:
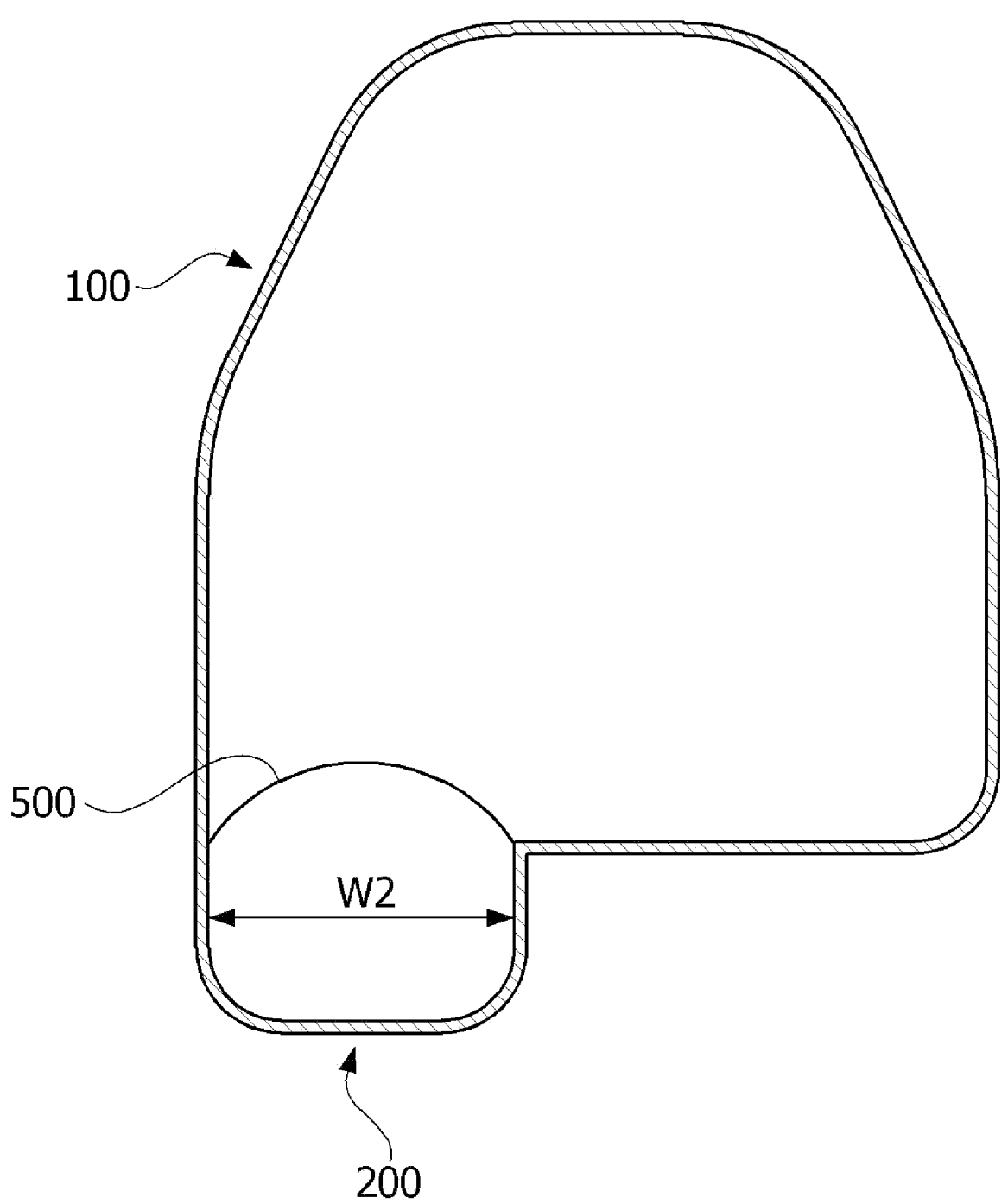
FIG. 14 is a view illustrating the partition wall disposed to be curved.
Figure 15:
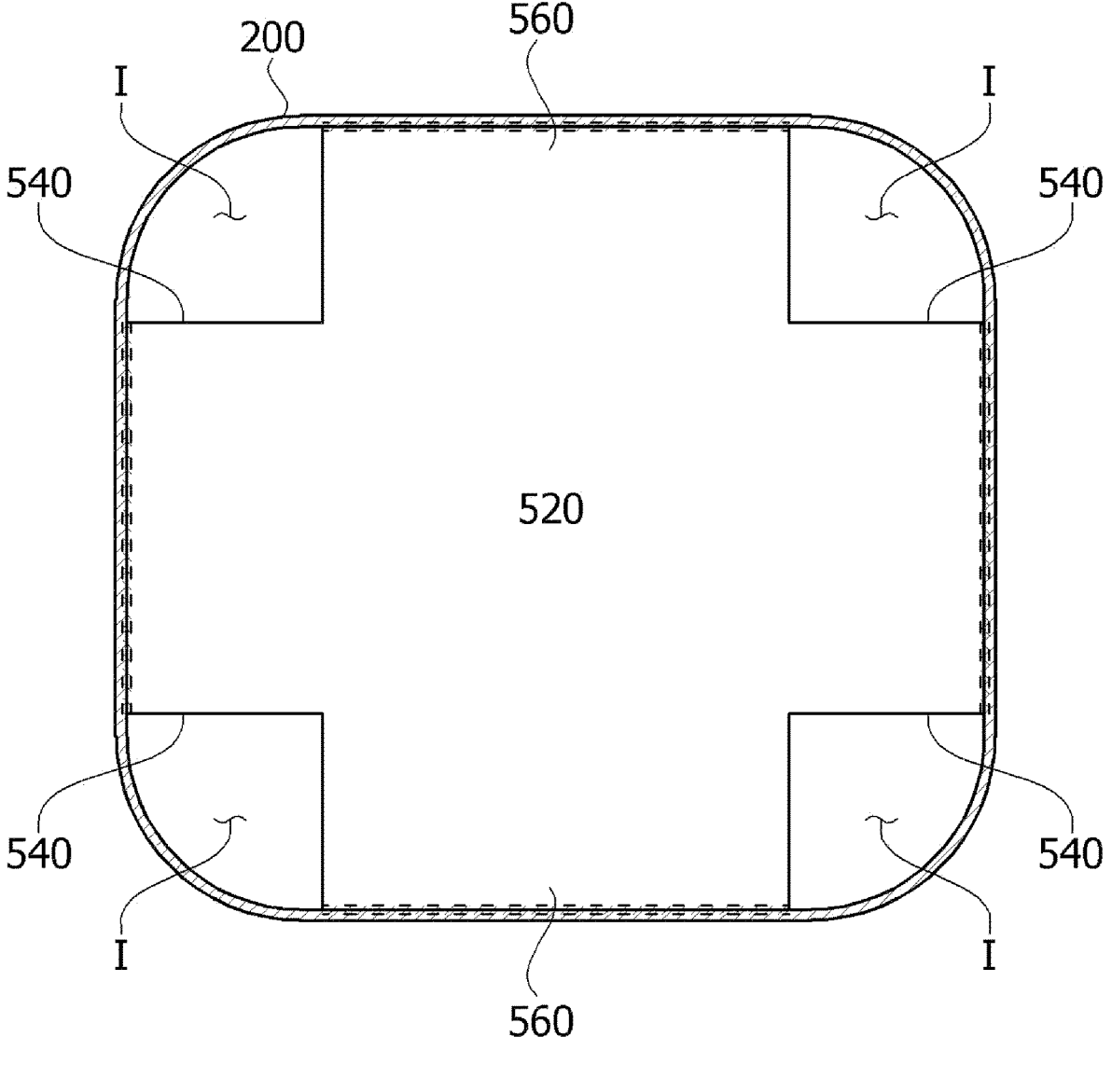
FIG. 15 is a cross-sectional view illustrating the partition wall of FIG. 12 and a second protruding which form an inlet.

FIG. 12 is a view illustrating another example of the partition wall, and FIG. 13 is a cross-sectional view illustrating the partition wall of FIG. 12 disposed in a first protruding panel. FIG. 14 is a view illustrating the partition wall disposed to be curved, and FIG. 15 is a cross-sectional view illustrating the partition wall of FIG. 12 and a second protruding panel which form an inlet.

Referring to FIGS. 12 to 15, a partition wall 300 may be disposed in a development part. The partition wall 300 may cover an entrance part 220 of a second protruding panel 200. The partition wall 300 may include a main body portion 320, a concave portion 340, and a coupling portion 360.

The main body portion 320 may form an exterior of the partition wall 300. The main body portion 320 may support the coupling portion 360. The main body portion 320 may be disposed at the entrance part 220 formed in the second protruding panel 200. Accordingly, the main body portion 320 may cover a portion of the entrance part 220 of the second protruding panel 200 to block gas flowing in a first protruding panel 100 from being introduced into the second protruding panel 200.

The concave portion 340 may be disposed at each corner of the main body portion 320. More specifically, the concave portion 340 may be a portion concavely recessed from the corner of the main body portion 320. Since the concave portion 340 is disposed at each of the corners of the main body portion 320, a plurality of concave portions 340 may be formed.

The coupling portion 360 may be disposed between the concave portions 340 and coupled to a boundary between the first protruding panel 100 and the second protruding panel 200. The coupling portion 360 may include a first coupling portion 362 and a second coupling portion 364.

Each of the first coupling portion 362 and the second coupling portion 364 may have a shape protruding from the main body portion 320. More specifically, the first coupling portion 362 may include a 1-1 coupling portion 362a and a 1-2 coupling portion 362b which protrude from both side portions of the main body portion 320, and the second coupling portion 364 may include a 2-1 coupling portion 364a and a 2-2 coupling portion 364b which protrude from the main body portion 320 and are disposed to intersect the first coupling portion 362.

The coupling portion 360 may have a shape protruding from the main body portion 320 as the concave portions 340 are formed in the main body portion 320. However, the coupling portion 360 is not limited thereto. The concave portions 340 are disposed between the first coupling portion 362 and the second coupling portion 364 of the coupling portion 360, and the concave portions 340 may be formed as the first coupling portion 362 and the second coupling portion 364 protrude from the main body portion 320. Accordingly, a size or shape of the concave portion 340 may be changed according to a size or shape of the coupling portion 360 without limitation. In addition, a size or shape of the coupling portion 360 may be changed according to a size or shape of the concave portion 340.

With the main body portion 320, the coupling portion 360 may be disposed at a portion of the entrance part 220 formed in the second protruding panel 200. Accordingly, with the main body portion 320, the coupling portion 360 may cover the portion of the entrance part 220 of the second protruding panel 200 to block gas flowing in the first protruding panel 100 from being introduced into the second protruding panel 200.

As described above, in a state in which the partition wall 300 is disposed in the development part, more specifically, covers the entrance part 220 of the second protruding panel 200, the partition wall 300 may form at least two or more inlets I with an inner surface of the second protruding panel 200.

Further referring to FIG. 15, the concave portion 340 of the partition wall 300 may form the inlet I with the second protruding panel 200. More specifically, the first coupling portion 362 including the 1-1 coupling portion 362a and the 1-2 coupling portion 362b and the second coupling portion 364 including the 2-1 coupling portion 364a and the 2-2 coupling portion 364b of the partition wall 300 may be coupled to the boundary between the first protruding panel 100 and the second protruding panel 200.

Accordingly, the inlet I may be formed between an edge region of the partition wall 300 and the inner surface of the second protruding panel 200. The inlet I may connect an inner portion of the first protruding panel 100 and an inner portion of the second protruding panel 200. That is, the inlet I may be used as a passage through which gas is introduced from the first protruding panel 100 toward the second protruding panel 200.

As described above, a passenger airbag 1 according to one embodiment of the present invention may delay a time at which gas is introduced into the second protruding panel 200 through the partition wall 300 disposed at the boundary between the first protruding panel 100 and the second protruding panel 200 compared to when there is no partition wall 300. This is to prevent the second protruding panel 200 from deploying earlier than the first protruding panel 100.

More specifically, when gas is generated from an inflator, the gas flows from the first protruding panel 100 toward the second protruding panel 200 in a direction in which the gas is supplied. In this case, when the partition wall 300 is not present, a phenomenon in which only the second protruding panel 200 is fully inflated by a flow of the gas flowing toward the second protruding panel 200 may occur in a state in which the first protruding panel 100 is not fully inflated.

This may cause a problem that the passenger airbag 1 does not reach a body portion of a passenger when a collision accident occurs. Accordingly, the partition wall 300 may be disposed in the deployment part in order to prevent the problem. That is, since an area of the entrance part 220 of the second protruding panel 200 is reduced due to the partition wall 300, an amount of the gas flowing from the first protruding panel 100 toward the second protruding panel 200 is reduced. Accordingly, after the first protruding panel 100 is sufficiently deployed, the second protruding panel 200 may be deployed.

As described above, since a structure in which the second protruding panel 200 is inflated after the first protruding panel 100 is sufficiently inflated through the partition wall 300 is provided, when a collision accident occurs, the deployment part may reach the body portion of the passenger sitting in a passenger seat in a time range calculated in a manufacturing process. Accordingly, when the collision accident occurs, an additional injury due to delayed deployment of the airbag can be prevented.

In addition, since the partition wall 300 is disposed at the boundary between the first protruding panel 100 and the second protruding panel 200, an area of the entrance part 220 formed in the second protruding panel 200 may be reduced. This means that, in a state in which gas is introduced into the second protruding panel 200, an amount of the gas flowing from the second protruding panel 200 toward the first protruding panel 100 is smaller than that in a conventional case in which a partition wall 300 is not present. Accordingly, when the passenger airbag 1 is deployed, a tension of the second protruding panel 200 may be maintained. Accordingly, when the second protruding panel 200 comes into contact with the passenger's head, a phenomenon in which the second protruding panel 200 is pushed by a force of the passenger's head coming into contact with the second protruding panel 200 may be prevented.

Referring to FIGS. 12 and 13, a first distance D1 from an end portion of the 1-1 coupling portion 362a to an end portion of the 1-2 coupling portion 362b of the partition wall 300 may be greater than a first width W1 of the second protruding panel 200. In addition, FIGS. 12 and 14, a second distance D2 from an end portion of the 2-1 coupling portion 364a to an end portion of the 2-2 coupling portion 364b of the partition wall 300 may be greater than a second width W2 of the entrance part 220 of the second protruding panel 200.

Accordingly, as illustrated in FIGS. 12 and 14, in a state in which the partition wall 300 disposed at the boundary between the first protruding panel 100 and the second protruding panel 200 covers the entrance part 220 of the second protruding panel 200, the partition wall 300 may be disposed to be curved toward the first protruding panel 100. This is for preventing an amount of gas accommodated in the second protruding panel 200 from being rapidly reduced and maintaining an inflation state of the second protruding panel 200 by reducing an amount of gas which returns to the first protruding panel 100 from the second protruding panel 200.

In the present embodiment, as illustrated in FIGS. 12 and 15, although it is illustrated that the concave portion of the partition wall is disposed at each of the corners of the main body portion, the present invention is not limited thereto. The concave portion 540 of the partition wall 500 may be formed not only at each of the corners of the main body portion 520 but also a region in which the coupling portion 560 is disposed. Accordingly, the inlet I formed using the partition wall 500 and the development part may also be formed in a region other than a corner region of the second protruding panel.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An airbag, the airbag comprising:

a first protruding panel configured to protrude toward a passenger seat provided in a vehicle;

a second protruding panel disposed on one or more of both side portions of the first protruding panel;

a partition wall disposed in the first protruding panel and the second protruding panel and configured to cover an entrance part of the second protruding panel, wherein the partition wall includes an inlet hole defined therein, the inlet hole configured to communicate with the entrance part of the second protruding panel in a state in which the partition wall covers the entrance part of the second protruding panel; and a guide panel connected to the partition wall and configured to connect an inner portion of the first protruding panel and an inner portion of the second protruding panel, wherein the guide panel has a hollow cylindrical shape, wherein the guide panel includes an entrance end portion connected to the inner portion of the first protruding panel by being connected to the partition wall and an exit end portion connected to the inner portion of the second protruding panel, wherein the entrance end portion of the guide panel is configured to communicate with the inlet hole of the partition wall, wherein the partition wall is configured to curve toward the first protruding panel in the state in which the partition wall covers the entrance part of the second protruding panel, and wherein, when an oblique collision accident occurs and a passenger's head comes into contact with the second protruding panel, the guide panel is configured to be bent.

2. The airbag of claim 1, wherein the partition wall comprises a main body portion configured to form an exterior; and wherein the inlet hole of the partition wall is defined within the main body portion.

3. The airbag of claim 2, wherein, in the state in which the partition wall covers the entrance part of the second protruding panel, both side end portions of the main body portion are coupled to a boundary, the boundary being defined between the first protruding panel and the second protruding panel.

4. The airbag of claim 2, wherein a first width of the main body portion of the partition wall is greater than a second width of the entrance part of the second protruding panel.

5. The airbag of claim 1, wherein the partition wall is configured to reduce an area of the entrance part of the second protruding panel.

6. An airbag, the airbag comprising:

a first protruding panel configured to protrude toward a passenger seat provided in a vehicle;

a second protruding panel disposed on one or more of both side portions of the first protruding panel;

a partition wall configured to adjust an inflow amount of gas flowing from the first protruding panel toward the second protruding panel, the second protruding panel being configured to be deployed after the first protruding panel is deployed, wherein the partition wall includes an inlet hole defined therein, the inlet hole configured to pass through a portion of the partition wall to connect an inner space of the first protruding panel to an inner space of the second protruding panel; and a guide panel connected to the partition wall and configured to connect an inner portion of the first protruding panel and an inner portion of the second protruding panel, wherein the guide panel has a hollow cylindrical shape, wherein the guide panel includes an entrance end portion connected to the inner portion of the first protruding panel by being connected to the partition wall and an exit end portion connected to the inner portion of the second protruding panel, wherein the entrance end portion of the guide panel is configured to communicate with the inlet hole of the partition wall, wherein the partition wall is configured to curve toward the first protruding panel in a state in which the partition wall covers an entrance part of the second protruding panel, and wherein, when an oblique collision accident occurs and a passenger's head comes into contact with the second protruding panel, the guide panel is configured to be bent.

7. The airbag of claim 6, wherein the partition wall includes a main body portion configured to form an exterior; and wherein the inlet hole of the partition wall is defined within the main body portion.

8. The airbag of claim 7, wherein a first width of the main body portion of the partition wall is greater than a second width of an entrance part of the second protruding panel.

9. A passenger airbag for a passenger seat in a vehicle, the passenger airbag comprising:

a first protruding panel configured to protrude toward the passenger seat;

a second protruding panel disposed on one or more of both side portions of the first protruding panel;

a partition wall disposed in the first protruding panel and the second protruding panel and configured to cover an entrance part of the second protruding panel; and a guide panel connected to the partition wall and configured to connect an inner portion of the first protruding panel and an inner portion of the second protruding panel, wherein the guide panel has a hollow cylindrical shape, wherein the guide panel includes an entrance end portion connected to the inner portion of the first protruding panel by being connected to the partition wall and an exit end portion connected to the inner portion of the second protruding panel, wherein the partition wall includes an inlet hole defined therein and configured to connect the inner portion of the first protruding panel and the inner portion of the second protruding panel, and wherein the entrance end portion of the guide panel is configured to communicate with the inlet hole of the partition wall, wherein the partition wall is configured to curve toward the first protruding panel in a state in which the partition wall covers the entrance part of the second protruding panel, and wherein, when an oblique collision accident occurs and a passenger's head comes into contact with the second protruding panel, the guide panel is configured to be bent.

10. The passenger airbag of claim 9, wherein the guide panel is disposed toward the second protruding panel from the first protruding panel in a state in which the guide panel is connected to the partition wall.

11. The passenger airbag of claim 9, wherein the inner portion of the first protruding panel, the inlet hole of the partition wall, and the guide panel define a path through which gas flows to the inner portion of the second protruding panel.

12. The passenger airbag of claim 9, wherein both side end portions of a main body portion of the partition wall are coupled to a boundary between the first protruding panel and the second protruding panel in a state in which the partition wall covers the entrance part of the second protruding panel.

13. The passenger airbag of claim 9, wherein a first width of a main body portion of the partition wall is greater than a second width of the entrance part of the second protruding panel.

14. A passenger airbag for a passenger seat in a vehicle, the passenger airbag comprising:

a first protruding panel configured to protrude toward the passenger seat;

a second protruding panel disposed on one or more of both side portions of the first protruding panel;

a partition wall provided in the first protruding panel and the second protruding panel and configured to cover an entrance part of the second protruding panel; and a guide panel configured to protrude from the partition wall and to guide gas flowing in an inner portion of the first protruding panel to an inner portion of the second protruding panel, wherein the guide panel has a hollow cylindrical shape, wherein the guide panel includes an entrance end portion connected to the inner portion of the first protruding panel by being connected to the partition wall and an exit end portion connected to the inner portion of the second protruding panel, wherein the partition wall includes an inlet hole defined therein, and wherein the entrance end portion of the guide panel is configured to communicate with the inlet hole of the partition wall, wherein the partition wall is configured to curve toward the first protruding panel in a state in which the partition wall covers the entrance part of the second protruding panel, and wherein, when an oblique collision accident occurs and a passenger's head comes into contact with the second protruding panel, the guide panel is configured to be bent.

15. A passenger airbag for a passenger seat in a vehicle, the passenger airbag comprising:

a first protruding panel configured to protrude toward the passenger seat;

a second protruding panel disposed on one or more of both side portions of the first protruding panel; and a partition wall configured to cover an entrance part of the second protruding panel, wherein the partition wall and an inner surface of the second protruding panel form two or more inlets in a state in which the partition wall covers the entrance part of the second protruding panel, wherein the partition wall includes a main body portion forming an exterior of the partition wall and concave portions disposed at corners of the main body portion, and wherein the concave portions and the second protruding panel form the inlets, wherein the partition wall includes coupling portions disposed between the concave portions, the coupling portions being coupled to a boundary between the first protruding panel and the second protruding panel, wherein the coupling portions include a first coupling portion including a first sub-coupling portion and a second sub-coupling portion configured to protrude from both side portions of the main body portion and a second coupling portion including a third sub-coupling portion and a fourth sub-coupling portion configured to protrude from the main body portion and to be disposed to intersect the first coupling portion, and wherein the partition wall is configured to curve toward the first protruding panel in the state in which the partition wall covers the entrance part of the second protruding panel.

16. The passenger airbag of claim 15, wherein a first distance from an end portion of the first sub-coupling portion to an end portion of the second sub-coupling portion of the partition wall is greater than a first width of the second protruding panel.

17. The passenger airbag of claim 15, wherein a second distance from an end portion of the third sub-coupling portion to an end portion of the fourth sub-coupling portion of the partition wall is greater than a second width of the entrance part of the second protruding panel.

18. A passenger airbag for a passenger seat in a vehicle, the passenger airbag comprising:

a first protruding panel configured to protrude toward the passenger seat;

a second protruding panel disposed on one or more of both side portions of the first protruding panel; and a partition wall configured to adjust an inflow amount of gas flowing from the first protruding panel toward the second protruding panel, the second protruding panel being configured to be deployed after the first protruding panel is deployed, wherein the partition wall comprises a main body portion configured to form an exterior thereof and concave portions disposed at corners of the main body portion, wherein the concave portions and the second protruding panel form inlets, and wherein the partition wall is configured to curve toward the first protruding panel in a state in which the partition wall covers an entrance part of the second protruding panel.

19. The passenger airbag of claim 18, wherein the partition wall comprises:

a coupling portion disposed between the concave portions and coupled to a boundary between the first protruding panel and the second protruding panel.

* * * * *